(No Model.)

O. HUFFMAN.
BARBED FENCE.

No. 380,573. Patented Apr. 3, 1888.

WITNESSES:
Fred G. Dieterich.
P. B. Turpin.

INVENTOR:
O. Huffman.
BY Munn & Co.
ATTORNEYS.

UNITED STATES PATENT OFFICE.

ORLANDO HUFFMAN, OF FRIEND, NEBRASKA, ASSIGNOR OF ONE-HALF TO HAMILTON W. HEWIT, OF SAME PLACE.

BARBED FENCE.

SPECIFICATION forming part of Letters Patent No. 380,573, dated April 3, 1888.

Application filed November 12, 1887. Serial No. 254,961. (No model.)

*To all whom it may concern:*

Be it known that I, ORLANDO HUFFMAN, of Friend, in the county of Saline and State of Nebraska, have invented a new and useful Improvement in Barbed Fences, of which the following is a specification.

My invention is an improvement in barbed fences, seeking to provide a simple construction which will be efficient against the passage of stock, is not likely to seriously damage stock attempting to break through it, will not damage stock coming accidentally in contact with either side of the fence, will usually wound the stock only in such places as may be conveniently treated, and will enable the cultivation of the land by the aid of horse-power closer to it than those barbed fences of ordinary construction.

The improved fence has other advantages; and it consists in certain features of construction and novel combinations of parts, as will be hereinafter described and claimed.

Figure 1:
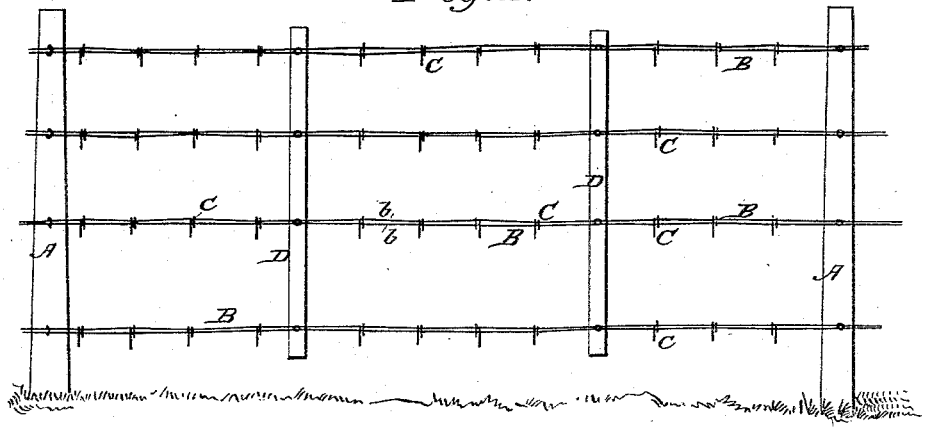
Figure 2:
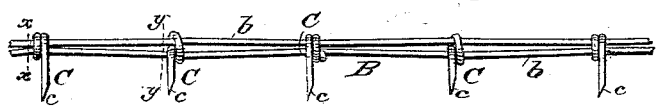

In the drawings, Figure 1 is a side elevation of a portion of a fence constructed according to my invention. Fig. 2 is a detail side view of a part of one of the cables and attached barbs; and Figs. 3 and 4 are sectional views on, respectively, lines $x\,x$ and $y\,y$ of Fig. 2.

As will be understood from that which I have already stated, my invention aims to provide a barbed fence which will be efficient against animals attempting to break therethrough without needlessly injuring them, and at the same time avoid damaging the animals which may come accidentally or otherwise against the fence from either side without intending to force a passage through the same. This end I attain by arranging the prongs of all the barbs to project from the cables in the same direction and secure all the cables in forming the fence so the said prongs will project downward from their respective cables.

In building the fence I employ posts A at suitable intervals, to which posts the cables B are suitably secured. These cables B are shown as composed of two strands, $b\,b$, of wire, which might be twisted together without departing from some of the broad features of my invention; but they are preferably not twisted together, but extend alongside of and one above the other for their full lengths. On these cables I secure the barbs C, which might have two points, but preferably have but a single prong, $c$, each, and are arranged on their supporting-cables in alternating series, as will be understood from Figs. 2, 3, and 4, those of one series being secured to the cable in the manner shown in Fig. 3, while those of the other series are secured to the cable in the manner shown in Fig. 4.

Figure 3:
Figure 4:

In Fig. 3 the barb is shown as twisted tightly around the two strands $b\,b$, binding such strands firmly and closely together.

In the construction shown in Fig. 4 the barb is twisted around and binds the strands together, but also has a portion passed between said strands, so that while it binds said strands together it also serves to slightly separate them, as shown in Fig. 2, and will be understood from Fig. 4. This construction and arrangement of the barbs serve in a measure to obviate the twisting of the strands; also to prevent the barbs from slipping from their places or bunching together.

To prevent the twisting of the strands and the consequent projection of the prongs of the barbs in other than a downward direction, I provide cleats or battens D, which are lapped against the several cables, arranged in series one above the other, and which are secured usually by nailing rigidly to the cleats or battens, so each of said cables will be prevented from twisting. Manifestly these battens can be arranged as closely together as may be found necessary to lock the cables from twisting.

The construction of the cable and the application of the barbs thereto in the manner described give the cable an even tension throughout its length, making it stronger than twisted wire and so less liable to break.

It is manifest that the downwardly-projected prongs are perfectly harmless unless the stock attempt to force a way through the fence.

As none of the prongs projects laterally, a horse can be driven as close to the fence shown as to any unbarbed fence, so that there is no waste of land close to the fence for lack of cultivation. Stock in endeavoring to go through a wire fence do not, as a rule, press down, but pass the head or nose under one of the cables and press up to make room to get through. Should the animal be forced through the fence by dogs or other animals, all the scratches will be inflicted on the upper side or back, where they can be easily treated, while the legs, udder, and other parts difficult to treat, which are usually torn by the ordinary barb fences, will not be injured.

Manifestly the barb shown in Fig. 3 might be used on cables formed of single wires without departing from some of the broad features of the invention.

Having thus described my invention, what I claim as new is—

1. The improvement in barbed fences, consisting of the posts, the cables extended therebetween and arranged one above the other, and the barbs secured thereto at intervals, said barbs projecting in one direction only from the cables, and all the barbs being projected in approximately a common plane and downward from the cables, substantially as set forth.

2. In a fence, a barbed cable consisting of two lengths or strands of wire extended side by side and a number of barbs secured at intervals thereto, the barbs being arranged in alternating series, those of one series being twisted around the strands of wire, binding them close together, while the barbs of the other series are passed between said strands, slightly separating them, and also twisted around such strands, substantially as set forth.

3. The improvement in barb fences herein described and shown, consisting of the posts, the cables formed of two strands of wire extended alongside of each other and not twisted together, such cables being arranged one above the other, the barbs secured to said cables and arranged in alternating series, the barbs of one series being twisted around the cables and binding the same closely together, while the barbs of the other series are twisted around and also passed between the strands, slightly separating the same, and the cleats or battens lapped against and extending between the cables and secured to them, substantially as and for the purposes specified.

ORLANDO HUFFMAN.

Witnesses:
H. W. HEWIT,
H. W. HEWIT.